(12) United States Patent
Menne (10) Patent No.: US 7,665,588 B2
(45) Date of Patent: Feb. 23, 2010

(54) STARTING UNIT

(75) Inventor: Achim Menne, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 440 days.

(21) Appl. No.: 10/595,647

(22) PCT Filed: Nov. 10, 2004

(86) PCT No.: PCT/EP2004/012700

§ 371 (c)(1),
(2), (4) Date: Aug. 10, 2006

(87) PCT Pub. No.: WO2005/050046

PCT Pub. Date: Jun. 2, 2005

(65) Prior Publication Data

US 2008/0120973 A1  May 29, 2008

(30) Foreign Application Priority Data

Nov. 14, 2003  (DE) ................................ 103 53 554

(51) Int. Cl.
*F16H 45/02* (2006.01)
(52) U.S. Cl. ........................................ 192/3.3; 192/57
(58) Field of Classification Search .................. 60/352, 60/353
See application file for complete search history.

(56) References Cited

U.S. PATENT DOCUMENTS

| 2,116,461 | A | 5/1938 | Fottinger |
| 2,731,119 | A | 1/1956 | Burdett et al. |
| 3,952,508 | A | 4/1976 | Bopp |
| 4,128,999 | A | 12/1978 | Yokoyama et al. |
| 6,394,243 | B1 | 5/2002 | Sasse |
| 2003/0168298 | A1 | 9/2003 | Holler et al. |

FOREIGN PATENT DOCUMENTS

| DE | 199 17 893 | 10/2000 |
| WO | 00/55519 | 9/2000 |

*Primary Examiner*—Sherry L Estremsky
*Assistant Examiner*—Edwin A. Young
(74) *Attorney, Agent, or Firm*—Baker & Daniels LLP (57) ABSTRACT

The invention relates to a starting unit (1, 1.2, 1.3, 1.4, 1.5, 1.6) comprising a starting element in the form of a hydrodynamic component (5, 5.2, 5.3, 5.4, 5.5, 5.6) and a housing (17, 18) that is coupled with the primary impeller (6) in a static or rotationally fixed manner and that encloses at least one impeller (7, 8) in the axial direction, thereby defining at least one working fluid guide channel or compartment (19). The invention is characterized in that the unit is provided with means (2) for influencing the transmission behavior of the hydrodynamic component (5). Said means comprise pressure medium-actuated integrated mechanical components (3) that have an at least indirect effect on the working cycle ensuing in the working compartment (8, 8.2, 8.3, 8.4, 8.5, 8.6). The pressure medium-actuated integrated mechanical components (3) are impinged upon by a pressure medium from the supply channel (20) or the first working medium guide channel or compartment (19), the position of the pressure medium-actuated integrated mechanical components (3) relative to the working compartment (8) being a function of the differential pressure of the pressure medium branched off from the first supply channel (20) or the first working medium guide channel or compartment (19) and the pressure in the interior of the housing (17, 18) in the area of the regulating device (26, 31).

19 Claims, 5 Drawing Sheets

STARTING UNIT

The invention relates to a hydrodynamic starting unit.

Starting units including a hydrodynamic clutch, particularly a controllable or regulatable hydrodynamic clutch, are known from the state of the art in a variety of designs. The starting unit includes thereby an input which can be coupled to a drive, and an output which can be coupled to a driveshaft. Between the input and the output there is located the hydrodynamic clutch, comprising a primary impeller and a secondary impeller, together comprising a torus-formed working compartment. The primary impeller possesses a so-called primary impeller housing, which is connected to it in a rotationally fixed manner, and completely encloses the secondary impeller in the axial direction. The starting unit moreover includes a switchable clutch in the form of a bypass clutch, which is arranged in parallel to the hydrodynamic clutch and can be switched either together with it or independently. This means that the two clutches form a power splitting structure, whereby the power flow may proceed either through one or the other of the clutches or be split between both. The switchable clutch comprises hereby at least a clutch input element and a clutch output element, whereby the clutch output element is coupled to the secondary impeller in an at least on average rotationally fixed manner. The clutch input element is connected with the primary impeller or with input E in an at least on average rotationally fixed manner. The means for generating a frictional connection between the individual clutch elements hereby comprise a piston element to which a pressure medium can be admitted. This can be located separately from the clutch disks, or, in a particularly compact embodiment, it can be directly formed by the secondary impeller. The hydrodynamic clutch is provided with a working fluid supply system. The clutch can be flooded by this system either centrifugally or centripetally. In the case of centripetal flow, the working fluid is guided through the working fluid guide channel along the outer rim of the secondary impeller, and is introduced into it in the radial direction in the area of the outer diameter of the torus-formed working compartment. Hereby the force generated by the working fluid is used to hold the switchable clutch in the open state, or at least to allow it to operate with some slip. The outlet from the torus-formed working compartment is hereby in the area of the radially inner diameter of the working compartment in a chamber beneath it, which is also called the second working fluid guide channel or chamber. Both the first working fluid guide channel and/or chamber, delimited by the inner circumference of the housing and the outer circumference of the secondary impeller, and the second working fluid guide channel or chamber, can hereby be interchanged regarding their function. This is particularly necessary when switching to a centrifugal flow. Then the working fluid is introduced into the hydrodynamic clutch through the second working fluid guide channel and/or chamber in the area of the radially inner diameter of the torus-formed working compartment, whereby the outlet is in the area of the radially outer diameter of the torus-formed working compartment at one of the impellers. The switchable clutch is then engaged. In this type of starting unit, therefore, transmitted power portions can be varied using the individual clutches—the switchable clutch or the hydrodynamic clutch. Hereby it is particularly desirable when operating the hydrodynamic clutch that when using it as a starting unit, precisely in the starting range, that is, in the range of very high slip, to keep the torque borne by the hydrodynamic clutch, which corresponds to the torque borne by the primary impeller, as low as possible to prevent negative feedback effects on the speed of the driving engine. This can be achieved on the one hand by configuring a minimum fill level, whereby, however, it has proved that this measure is not sufficient in itself, since precisely in the range of very high clutch slip between 70 and 100% inclusive, that is, a correspondingly low speed ratio between the primary impeller and the secondary impeller, too high a torque is still transmitted through the clutch. This can result in an undesirable effect on the speed of the driving engine coupled through the hydrodynamic clutch, so that here the desired driving dynamics are not provided.

The invention thus has the task of demonstrating a hydrodynamic clutch for use in starting units of the type described above, in which with the lowest possible manufacturing and control system costs a minimization of the idle torque, particularly the torque transmitted through the hydrodynamic clutch at maximum slip, can be achieved.

According to the invention, in a starting unit with an input which can be coupled to a drive and an output which can be coupled to a load, between which a starting element in the form of a hydrodynamic component is located, means are provided for influencing the transmission ratio of the hydrodynamic component, said means being in the form of mechanical or pressure medium actuated integrated mechanical components which at least indirectly affect the working circuit located in the working compartment between the primary impeller and the secondary impeller. The pressure medium actuated integrated mechanical components are hereby impinged upon by a differential pressure between the pressure in a working fluid guide channel or chamber of the working compartment, in a chamber coupled with the working fluid guide channel, or in a connection line and the pressure present in the housing. The starting unit comprises for this purpose a housing which encloses at least an impeller, particularly the secondary impeller, in the axial direction while forming a side compartment in which the switchable clutch is located. The actuating system of the clutch hereby delineates a first working fluid guide channel or chamber. This is at least indirectly, that is, directly or via additional connection channels or lines, connected to the working compartment of the hydrodynamic clutch and to a working fluid source. Also provided is an additional second working fluid guide channel or chamber, which is coupled to the working compartment in the area of its inner diameter. Both working fluid guide channels or chambers are coupled to a working fluid supply system. Corresponding to the connection of these channels or chambers to the outlet or inlet of working fluid to or from the working compartment, a centripetal or centrifugal flow through the hydrodynamic clutch will result. In the case of centripetal flow, the switchable clutch is simultaneously deactivated or operated at high slip, in that the working fluid is guided between the elements which can be brought together into a working connection, and these are held apart due to the pressure, or, however, the working fluid acts in a corresponding manner on the actuating system connected to the switchable clutch.

With the invented solution it is possible to use already existing lines and channels for admission to an actuator system, whereby here, too, admission to the integrated mechanical components occurs only if the hydrodynamic clutch is in fact engaged, that is, in the case of centripetal flow. In the state of centrifugal flow, then, there is generally no admission to the actuator system. The engagement of the actuator system is thus directly coupled to the engagement of the hydrodynamic clutch due to its connection with the first working fluid guide channel or chamber used in centripetal flow as the inlet channel or chamber. The actuation travel of the integrated mechanical components is hereby a function of the pressures in the first working fluid guide channel or chamber or a channel or chamber connected to it, and the interior pressure present in the housing. The integrated mechanical components can hereby preferably bear in the starting range, that is, for very high slip values, while they are returned to a position of less influence over the flow circulation when the slip reduces. Their influence is preferably completely eliminated in low slip ranges.

The integrated mechanical components may hereby take effect at an arbitrary diameter between the inner diameter and the outer diameter of the working compartment. Their effect hereby results from projection into the working circulation, whereby the points or surfaces of interference caused by the integrated mechanical components in this condition are oriented at an angle to the flow circulation in the working circulation.

There is absolutely no restriction on the structure of the individual integrated mechanical components. These may be implemented as arbitrarily formed elements suitable for influencing the flow circulation in the working compartment. However, preferably bolt- or at least partial ring-formed elements, and preferably ring-formed elements are used. The effective surfaces of these hereby extend over at least a partial area in the circumferential direction. It is hereby possible to use only one element, or multiple elements spaced away from one another in the circumferential direction, particularly in the case of bolt elements. The actual selection of required measures depends on the desired change in torque acceptance at a desired fill level. There is always the possibility of implementing integrated mechanical components as separate elements which can be introduced into the working compartment or to form them in a particularly advantageous manner, since it can be implemented with a minimal number of additional components, from the individual impellers themselves. In the latter case, a partial region of the walls guiding the flow in the working compartment can be moved in the axial direction, if it is a ring-formed wall region. For implementations of the impellers with subdivided segments in the circumferential direction, motility in the radial direction is also possible.

The integrated mechanical components, depending on their implementation in the state of centripetal flow, are either brought into the working chamber or pushed in or, in the case of their implementation as a component of one of the impellers, moved away from that impeller. In this regard, when designing the actuation system, the direction of action and/or the amount of the pressure proceeding from the first working fluid guide channel or chamber must be taken into consideration.

The actuation systems of the integrated mechanical components, according to a particularly advantageous embodiment, are preferably always pivoted on the impeller to which the integrated mechanical components are attached. If they are attached to the primary impeller, the pivoting then occurs at this impeller or at the housing which is connected to the primary impeller in a rotationally fixed manner. This means that the actuation system always rotates at the same speed as the impeller, particularly the primary impeller, and thus no differences are possible due to slip. This is analogously valid for the secondary impeller.

A further possibility is that the actuation system pivots on the actuation system of the switchable clutch, particularly the piston, which is connected to the primary impeller or the secondary impeller in a rotationally fixed manner. However, this depends on the spatial arrangement of the primary and secondary impellers and the desired effect of the integrated mechanical components. If the secondary impeller is spatially in front of the primary impeller in the axial direction, however, this is sensible only if the actuation system strikes the integrated mechanical components in the secondary impeller It is always the case that the integrated mechanical components may be located and manipulated on either the primary impeller or the secondary impeller, whereby according to the selection of guidance of the integrated mechanical components, the arrangement of the actuation system follows. Hereby it must always be the goal that there is no slippage between the elements on which the actuation system is located and the corresponding impeller. In this case, it is sufficient when removing the integrated mechanical components from the working compartment that there is a binding connection with the inner circumference of the inner wall of the impeller in question.

The actuation system is, in the simplest case, implemented as a cylinder-piston unit. The working chamber housing the cylinder or the piston is hereby then formed by the wall of the housing of the primary housing or the actuation system of the switchable clutch. The connecting line to the working chamber can hereby lead through intermediate chambers in the wall of the housing, through the wall, or through a separate line to the actuation system of the switchable clutch.

Regarding the embodiment and arrangement of the cylinder-piston unit, there are a number of possibilities. The linkage of the connection to the integrated mechanical components is always designed so that the desired direction of motion is achieved depending on the implementation as ring slide or bolts or impeller segment. The impact is always preferably in the direction of movement. Depending on this, its path is determined from that of the first working fluid guide channel or chamber or a channel connected to that.

The invented solution is explained below based on figures. In detail, the following are shown.

Figure 1:
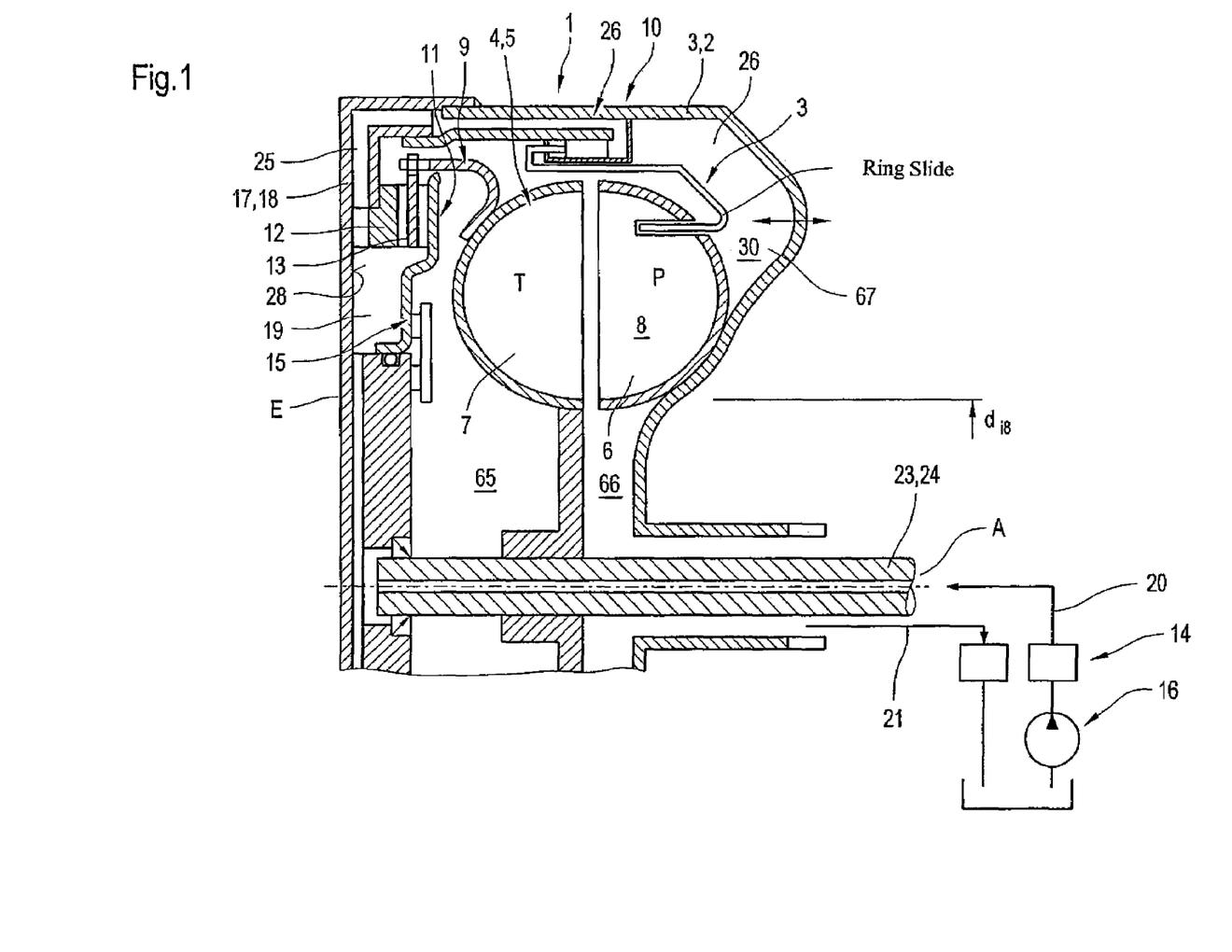
FIG. 1 shows a simplified schematic representation of the basic principle of construction of a starting unit designed according to the invention.

FIG. 1 shows a simplified schematic representation, based on an axial cross-section through a starting unit 1, of the basic principle according to the invention of actuation of the means of influencing the transmission ratio 2 in the form of pressure-regulated integrated mechanical components 3. The starting unit 1 comprises an input E which can be connected to a drive and an output A which can be connected to a subsequent gear stage or a load. Starting unit 1 furthermore comprises a starting element 4. In the present case, this is implemented in the form of a hydrodynamic clutch 5 with two impellers, a primary impeller 6 functioning as a pump wheel and a secondary impeller 7 functioning as a turbine wheel, which together form a working compartment 8 which can be filled with working fluid. The hydrodynamic clutch 5 has no guide wheel and functions only as a speed converter between input E and output A. The primary impeller 8 is for this purpose connected with, or formed by, the input and the secondary impeller 7 with or by output A. Starting unit 1 furthermore comprises a switchable clutch 9 in parallel with the starting element 4 in the form of a hydrodynamic clutch 5. Hydrodynamic clutch 5 and switchable clutch 9 can be switched either separately or together. The hydrodynamic clutch 5 and the switchable clutch 9 are thus located in two different power branches, a first power branch 10 and a second power branch 11. The first power branch 10 thus enables the power transmission through hydrodynamic clutch 5 and the second power branch 11 enables power transmission through switchable clutch 9. Switchable clutch 9 comprises at least two coupling elements which can be brought into a working connection with one another, preferably in the form of clutch disks, that is, looking in the force flow direction between input E and output A of starting unit 1, a first clutch element which can be designated clutch input 12, and a second clutch element which is designated clutch output 13. The clutch is preferably designed as a multiple disk clutch. The working connection due to frictional connection between clutch input 12 and clutch output 13 can hereby be implemented directly or indirectly. In the former case, the frictional connection is generated directly between the clutch input and clutch output, while in the second case there are additional elements interposed bearing frictional surfaces.

For the purpose of power distribution, each transmission element—hydrodynamic clutch 5 and switchable clutch 9—has a separate actuation system to provide switchability, indicated here only as a black box in the form of a valve arrangement for the hydrodynamic clutch with 14 and assigned 15 for the switchable clutch 9 in the form of a piston. The switchability of switchable clutch 9 is provided by the generation of a corresponding actuation pressure, and the switchability of hydrodynamic clutch 5, for example, by the filling and emptying of working compartment 8, whereby for engagement of actuation system 15, actuation system 14 is again involved. Direction of the transmitted power portion through the first and/or second power branch 10 or 11 is performed by control or variation of the actuation pressure on switchable clutch 9 and control of the position of the integrated mechanical components in hydrodynamic clutch 5. Hereby at least three basic functional states are differentiated. In the first basic functional state, only hydrodynamic clutch 5 is engaged. In this state, power applied to input E is only transmitted through hydrodynamic clutch 5. Switchable clutch 9 is deactivated.

In the second basic functional state, switchable clutch 9 is engaged. In this state, power applied to input E is transmitted only over this clutch. The hydrodynamic clutch 5 is deactivated. This occurs due to change in the actuation pressure, so that the clutch is operated without slippage.

In the third basic functional state, both power branches 10 and 11 are activated, that is, a first power portion is transmitted by hydrodynamic clutch 5 and a second power portion is transmitted by switchable clutch 9. In addition, under a further aspect, the individual power portions can be controlled independently of one another. This third basic functional state includes a temporary shared activation or an activation over a large part of the starting range.

In the first basic functional state, the so-called clutch or converter mode, working fluid is introduced to working compartment 8 by a working fluid guide or supply system 16, whereby the flow in starting unit 1 in this case occurs centripetally.

Starting unit 1 includes a housing 17 which is designed as a static housing or, as shown in this figure, as a rotating housing in the form of a primary impeller housing 18, which is connected with the primary impeller 6 in a rotationally fixed manner, or together with it forms an integral structural unit, and which encloses the secondary impeller 7 in the axial direction, forming a side chamber 65. The primary impeller housing 18 hereby encloses the secondary impeller 7 both completely in the circumferential direction and also in the axial direction. In side chamber 65, formed from the outer circumference of secondary impeller 7 and the inner circumference 28 of housing 17, actuation system 15 is located. With inner circumference 28 of housing 17, this forms a first working fluid guide channel or chamber 19, whose pressure impinges upon actuation system 15. Furthermore there is an additional second working fluid guide channel or chamber 66, which opens in the area of the inner diameter $d_{18}$ of the working compartment or below it. The first working fluid guide channel or chamber 19, for the operation of the hydrodynamic element in clutch or converter mode, depending on the implementation, as hydrodynamic clutch 5 or a converter not yet shown here, is also used as a working fluid guide channel or chamber to working compartment 8, and is connected to working fluid intake line 20, while the second working fluid guide channel or chamber 66 functions in this state as drainage channel 21. The switchable clutch 9 is designed in such a way that it is suitable in the first functional state for opening due to the working fluid guided through the first working fluid guide channel or chamber 19. the switchable clutch 9 is thus held in the open state due to the pressure of the working fluid in the first working fluid guide channel or chamber 19. By means of a selective change in the function of the individual working fluid guide channels or chambers 19, 66, the flow direction through the hydrodynamic components, particularly the hydrodynamic clutch 5, can easily and simply be changed between centripetal and centrifugal.

The inlet to the first working fluid guide channel or chamber 19 can be implemented in a variety of ways. It can, for example, be achieved through output shaft 24 of starting unit 1, implemented as a hollow shaft 23. According to the invention, the working circulation has means 2 for influencing the transmission ratio, particularly for influence of the flow circulation of the working circulation located in working compartment 8, said means being implemented as pressure-regulated integrated mechanical components 3. According to the invention, these are actuated by working fluid diverted from the working fluid guide channel or chamber 19. For this purpose, there is at least one connecting line 25 between the working fluid guide channel or chamber 19 and the pressure-regulated integrated mechanical components 3, particularly their actuation system 26. These pressure-regulated integrated mechanical components 3 can be implemented in different ways. Common to all, however, is the fact that they effect the diversion of the flow circulation of the working circulation located in working compartment 8. For this purpose, they are implemented as elements arranged at an angle to the flow circulation in working compartment 8, or as guide elements oriented parallel to the flow circulation, for instance in the form of walls or wall regions of the impellers which can be moved in their position in the axial direction and/or, in the case of the implementation of an impeller with segments distributed in the circumferential direction, in the radial direction. Examples for the concrete embodiment are shown in the following figures. The deciding point is that no additional pressure medium source is necessary for actuation of the controlled integrated mechanical components, and the pressure already needed for activation and deactivation of switchable clutch 9 is used. The engagement of the actuation system 26 is achieved with a pressure proportional to the pressure in the first working fluid guide channel or chamber 19, or to a differential pressure determined by the same. This differential pressure results from the pressure in the first working fluid guide channel or chamber 19 or in a connecting line 25 coupled to it, leading to actuation system 26, and from the pressure in the interior of housing 17 or primary impeller housing 18, particularly in the intermediate chamber 30 between the impellers and the housing.

Figure 2:
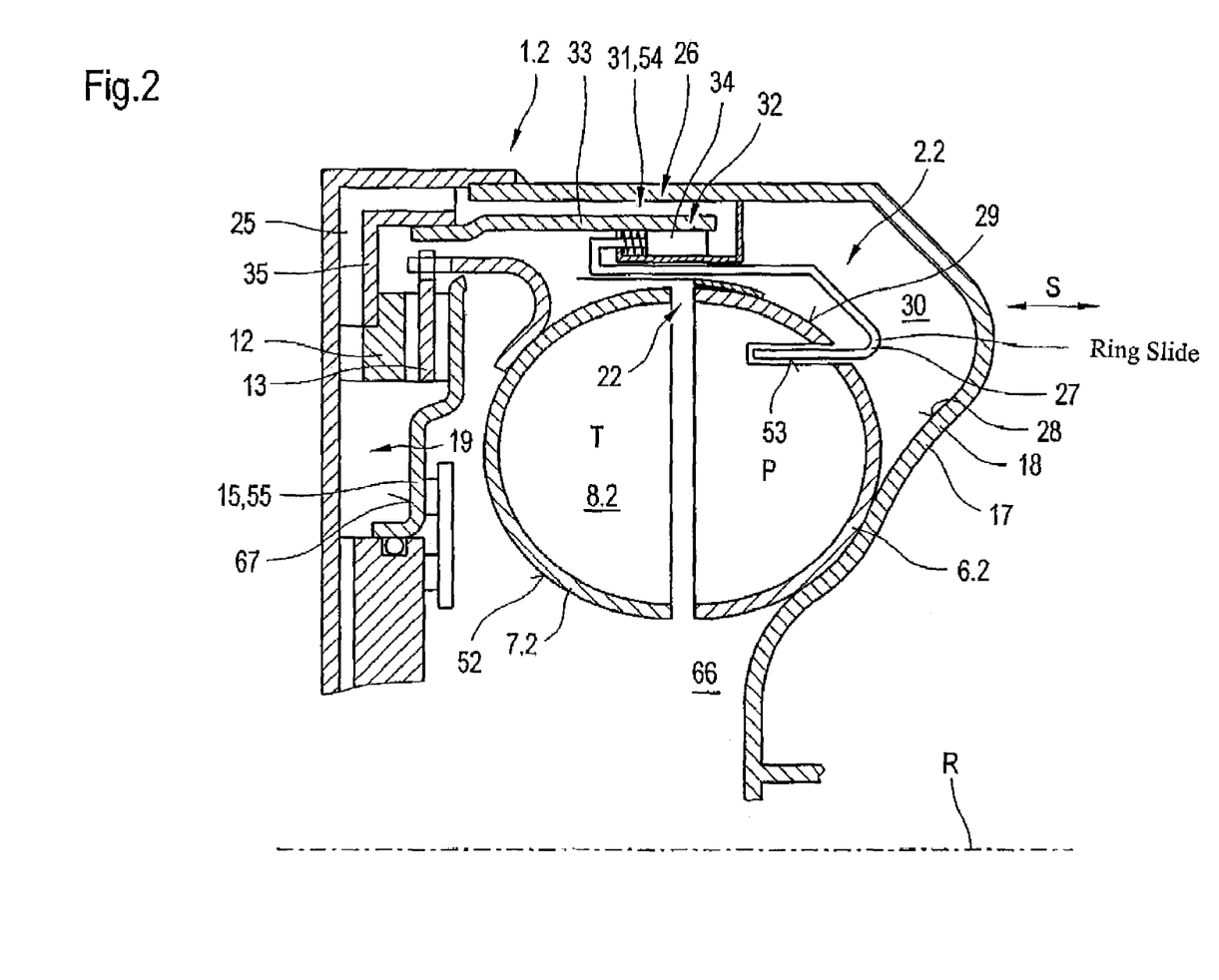
FIG. 2 shows an embodiment of integrated mechanical components on the primary impeller according to the invention.

FIG. 2 shows a first embodiment possibility for a starting unit 1.2 with means 2.2 for influencing the transmission ratio, in the form of so-called ring slides 27, which operated in working compartment 8.2. These are ring-shaped or partially ring-shaped elements which extend in the axial direction at least partially through an impeller, whereby the inner circumference 53 of these ring-shaped or partially ring-shaped elements is located at an angle to the flow circulation in working compartment 82, preferably nearly vertically. If implemented as a ring-shaped element, only partially ring-shaped extensions lead in an axial direction to this in working compartment 82 and through the wall of one of the impellers 6.2, 7.2. Ring slide 27 is here attached to primary impeller 6.2. It is guided at primary impeller 6.2 and can slide against this in the axial direction, that is, parallel to rotational axis R. The sliding movement thus moves into working compartment 8.2, and in the non-influencing state, into intermediate chamber 30 as a portion of the interior space of the housing, between the inner circumference 28 of housing 17, or primary impeller 18 and the outer circumference 29 of the impellers, particularly the primary impeller, whereby then no influence is exerted on the flow circulation in working compartment 8. Ring slide 27 has an actuating system 31. This corresponds to actuating system 26 in FIG. 1. This is preferably located at housing 17, particularly primary impeller housing 18, and connected to ring slide 27. In the case illustrated, the actuating system 31 includes a cylinder-piston unit 54 which can be actuated with pressure medium and which comprises a cylinder 32 whose working piston 34 is connected to ring slide 27. The face 33 connected to ring slide 27 is thereby impinged upon by the pressure in the interior of housing 17, while a face away from that face can be impinged upon by a pressure medium in the form of working fluid diverted from the working fluid guide channel or chamber 19 through a connection line 25. Cylinder 32 can hereby be formed from housing 17 or primary impeller housing 18 or an element connected to this in a fixed or rotationally fixed manner. Into this, then, working piston 34 is guided. The connecting line to the working fluid guide channel or chamber 19, which is designated 25, is thereby preferably implemented as a line and/or channel and/or chamber integrated into the housing, whereby it is formed of separate line elements or integrated components, here in walls 35 built into the housing. The formation of lines is achieved preferably by integration into wall regions in primary impeller housing 18, but separate pipelines are equally possible. According to a particularly advantageous embodiment as shown in FIG. 2, connection line 25 is located in the area of linkage of the first clutch disk 12 of switchable clutch 9. Thus the pressure in the working fluid guide channel or chamber 19 can propagate into connecting line 25. The pressure in the working fluid guide channel and/or chamber 18 thereby also impinges upon actuating system 15 in the form of piston 55 to engage switchable clutch 9, which itself is linked to the primary impeller housing 18, preferably in a rotationally fixed manner but either with a linkage or in such a way that it can slide against it in the axial direction. Chamber 19 is thereby limited largely between the inner circumference 28 of primary impeller housing 18 or an element connected to it in a rotationally fixed manner and the face 67 of piston 55 facing away from outer diameter 52 of the secondary impeller 82. Piston 55 is thereby pretensioned in its disengaged state by the pressure in working fluid guide channel or chamber 19, so that in this state the switchable clutch 9 is closed. Only the pressure in the working fluid guide channel or chamber 19 results in a pressing together of the individual clutch elements and thus the deactivation of switchable clutch 9.

Depending on the diversion of the quantity of working fluid and implementation of connecting line 25 and the pressure in the interior of housing 17, the pressure acting on piston 34 is determined. This is, for example, converted into a positioning travel S for the axial movement of ring slide 27.

In order to avoid any hampering of ring slide 27 in the non-influenced state, and in order to have a fixed assignment to the appropriate impeller when engaged, the ring slide 27 and accompanying actuation system 31 should rotate with the same speed as the impeller on which it acts. Thus the linkage if assigned to primary impeller 6.2 probably goes to the primary impeller housing 18 connected to it in a rotationally fixed manner. The guiding of the pressure medium in the form of working fluid diverted from working fluid intake channel 20, particularly from working fluid guide channel or chamber 19 can, as shown in FIG. 2, occur around the secondary impeller 7.2.

Although in FIG. 2 the ring slide 27 affects the working circulation in working compartment 8 through primary impeller 6.2, embodiments with this type of integrated component in the form of ring slides 27.3 on secondary impeller 7.3 are also possible. This type of design is described in FIG. 3. The basic structure of starting unit 1.3 corresponds to that shown in FIG. 1, so that for identical elements the same numbering is used.

Figure 3:
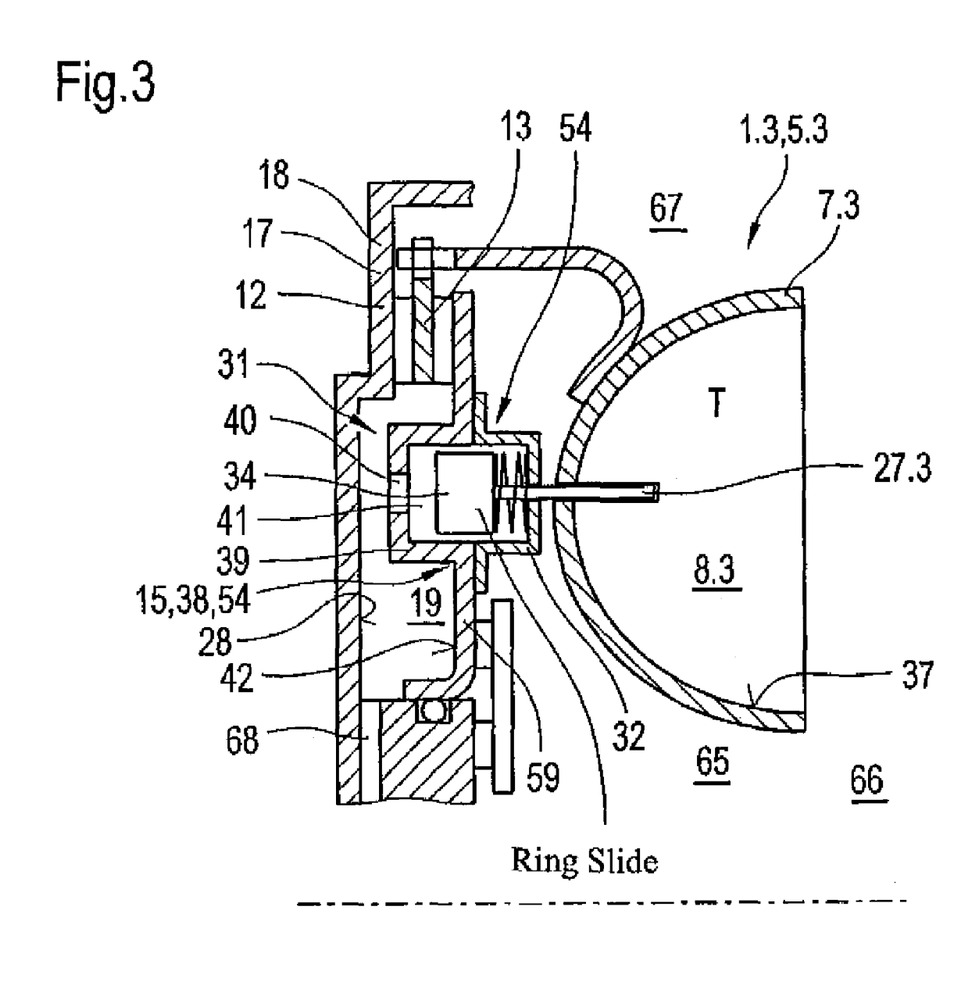
FIG. 3 shows a further embodiment of integrated mechanical components on the secondary impeller according to the invention.

To influence the transmission ratio of the hydrodynamic components, particularly hydrodynamic clutch 5, there is also a ring slide 27.3 here which is attached to secondary impeller 7.3. This extends through wall 36 of the secondary impeller 7.3. Ring slide 27.3 can be moved in the axial direction into working compartment 8.3. The blades of secondary impeller 7.3 has slots for this purpose. In the non-effective state, this is moved in the axial direction in such a way that it is located with its outer edge outside secondary impeller 7.3. Ring slide 27.3 has an actuating system 31 which is preferably implemented as a cylinder-piston unit 54. Piston 34 is hereby connected with ring slide 27.3 and also leads in the axial direction in cylinder 32. Cylinder 32 is formed by an element connected in a fixed manner to housing 17 or, in the case shown here, connected to primary impeller 18 in a rotationally fixed manner, in the form of piston 55 of actuator system 15 of the switchable clutch 9. This forms chamber 41 which can be impinged upon by the pressure medium, in which chamber piston 34 can moved. Piston 34 is hereby implemented as a single piston, ring piston, or partial ring piston. Piston 55 can be moved in the axial direction to primary impeller 18 or can be pivoted against housing 17 or primary impeller 18, so that upon application of pressure when piston 55 is activated, clutch input 12 forms a frictional connection with clutch output 13, which is coupled with secondary impeller 7 in a rotationally fixed manner. In the case shown, all elements are implemented as sheet metal form elements. This ensures a relatively easy construction. The guiding of ring slide 27.3 is performed by piston 34 of cylinder-piston unit 54 of actuation system 31. Piston 55 of actuation system 15 and cylinder 32 hereby preferably form a single component 30. Cylinder 32 is hereby formed by corresponding formation of piston 55 and an additional element 39.

The pressure medium flow diverted to chamber 41 from the working fluid guide channel or chamber 19 is, for example, implemented through a connecting line 40 connected to it. The inlet to chamber 19 occurs, for example, through a connecting line 68, which is preferably integrated directly into housing 17 or the wall of primary impeller 18, and is connected to working fluid guide channel 20, in the same, and is led through chamber 19 to cylinder-piston unit 54, whereby this guiding occurs along the face 42 of piston 55 of actuation system 15 facing away from secondary impeller 7.3. The working fluid flow is thus guided behind piston 55 and exerts pressure on piston 55. Furthermore, a connection is formed through connecting line 40 in the wall of cylinder-piston unit 54, whereby cylinder 32 is here formed on piston 55. Here, too, the diversion is either performed directly from working fluid guide channel or chamber 19, as shown, and thus indirectly from working fluid guide channel 20 connected to it, for example through connecting line 68 with the working fluid guide channel 20, not shown here but connected to the working fluid source.

The ring slides 27 and 27.3 shown in FIGS. 1 through 3 are thereby constructed in such a way that they preferably lie in the circumferential direction as at least a partially ring shaped element, so that a corresponding opening exists in the impeller for guidance and/or implementation of the engagement of ring slides 27, 27.3 and the blades are designed with protection in those areas.

Figure 4:
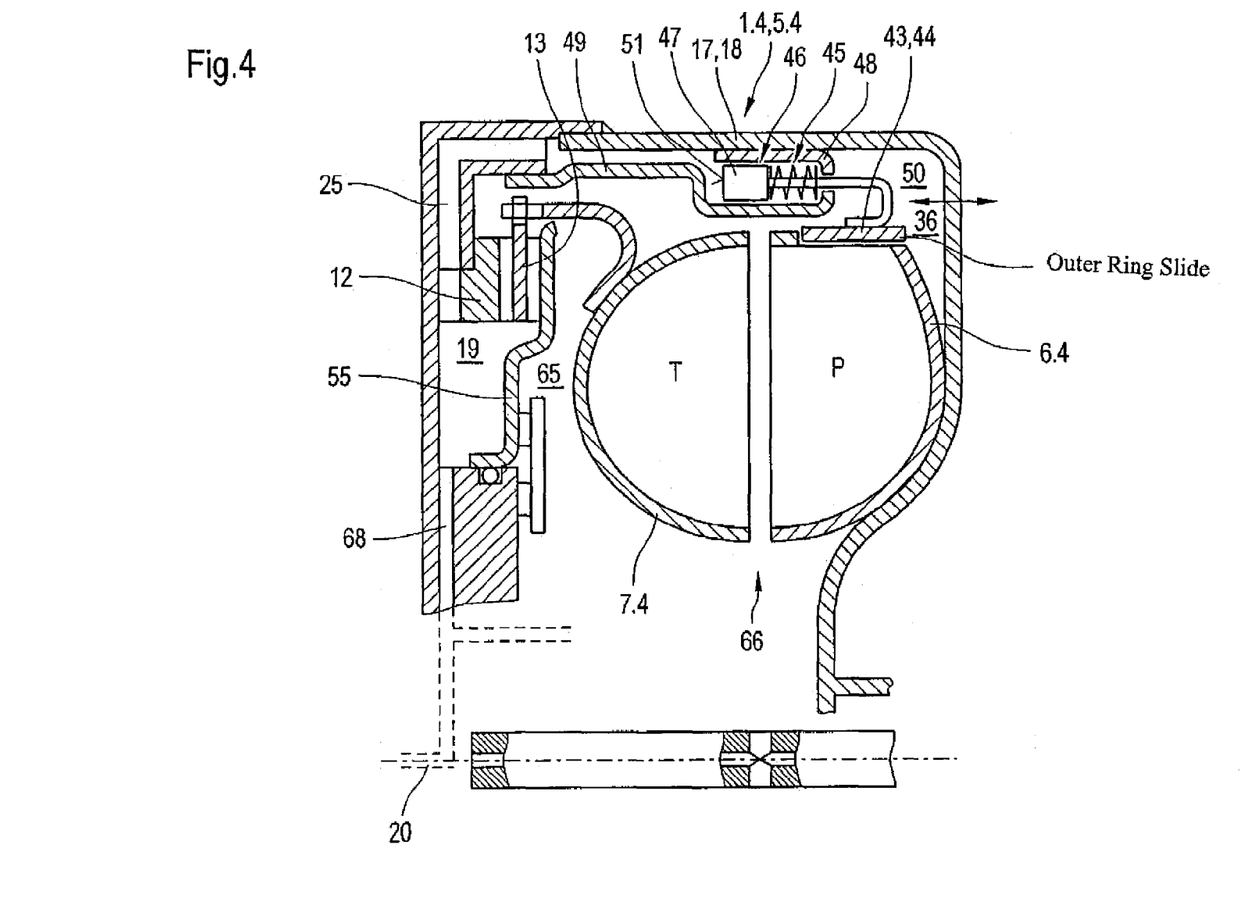
FIG. 4 shows a further embodiment of integrated mechanical components on the primary impeller according to the invention.

Although FIGS. 2 and 3 show pressure medium actuated integrated mechanical components 3 which engage directly into the working circulation in working compartment 8, FIG. 4 shows an embodiment which is characterized by the movement of individual partial regions of the walls guiding the working circulation. FIG. 4 thereby shows an embodiment with motility of a wall region 43 on primary impeller 6. This motility is preferably implemented in the axial direction, since this is characterized by a particularly simple design. The basic structure of the rest of starting unit 1.4 corresponds largely to that described in FIGS. 1 through 3, so that for identical elements, the same numbering is used here as well. Wall region 32 hereby represents a ring-shaped element 44, which can be actuated using a pressure medium actuated actuation system 45. Actuation system 45, too, hereby preferably comprises in the simplest case a cylinder-piston unit 46, whereby piston 47 is at least indirectly connected with ring-shaped element 44 and, so to speak, together with this forms an external ring slide. Piston 47 is guided in cylinder 48, which is formed from housing 17 and/or primary impeller housing 18 and the wall elements 49 connected to it. These additional wall elements 49 are preferably sheet metal form parts, which are also at least indirectly fastened to housing 17 and/or primary impeller housing 18 and form connection channel 25 for the actuation of face 51 of piston 47, which faces in the direction of motion during operation. The actuation of piston 47 occurs with differential pressure between the pressure propagated through connecting line 27 to face 51 from the first working fluid guide channel or chamber 19 and the pressure in the interior chamber of housing 17. Connecting channel 25 is connected to the working fluid guide channel, particularly to working fluid guide channel or chamber 19 or with the working fluid guide channel 20 connected to it.

Figure 5:
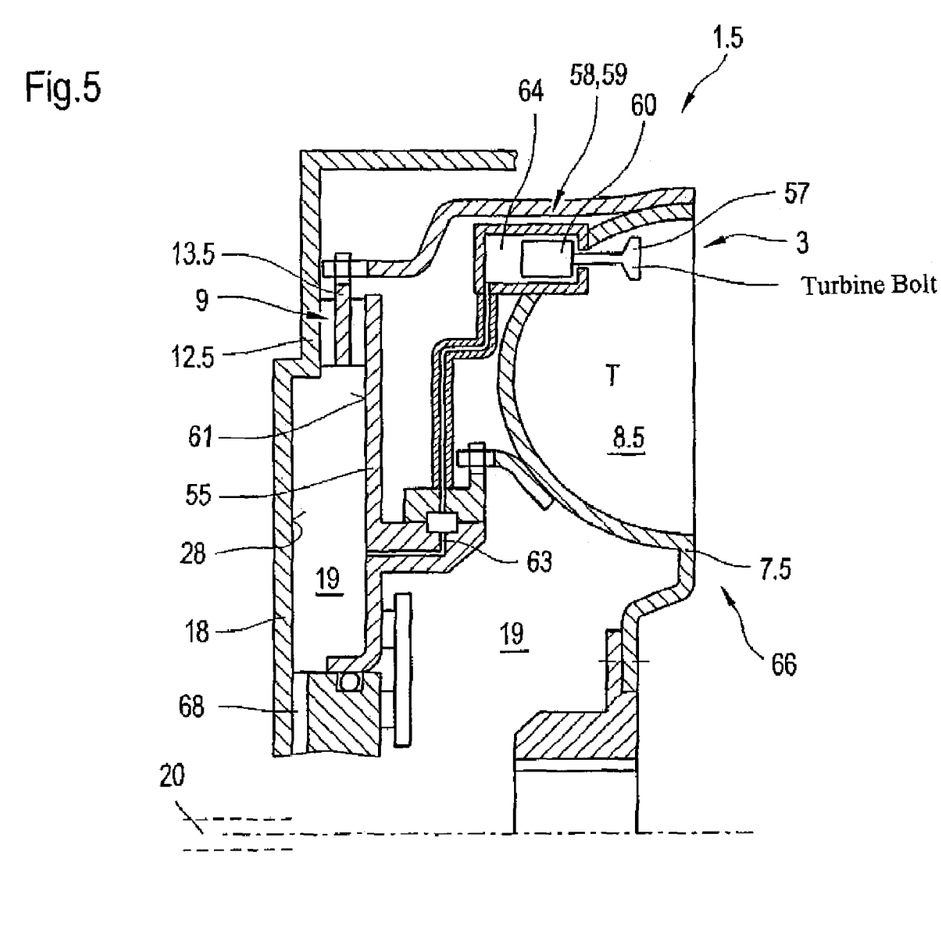
FIG. 5 shows a further embodiment of integrated mechanical components on the secondary impeller and their actuation according to the invention.

FIG. 5 shows another alternative embodiment according to FIG. 3. In this, instead of a ring slide, integrated mechanical components 3 are used in the form of turbine bolt 57. The actuation of these occurs analogously to the description in FIG. 3 for ring slide 27.3. In FIG. 5, the turbine bolt 57 is guided along secondary impeller 7.5. It extends in the actuated state in the axial direction into working compartment 8. Cylinder-piston unit 58 of actuation system 58 is thereby located, for example, on secondary impeller 7.5 or connected to it in a rotationally fixed manner. Also connected to secondary impeller 7.5 is here piston 55 for actuation of switchable clutch 9, particularly of the two clutch disks 12.5 and 13.5, whereby clutch disk 13.5 is connected in a rotationally fixed manner with secondary impeller 7.5 Piston 55, which is connected to primary impeller 18 in a rotationally fixed manner but can still be moved or linked in the axial direction, hereby serves to guide the pressure medium to cylinder-piston unit 58. However, in this case, due to the connection between piston 55 and cylinder-piston unit 58, a relative movement in the circumferential direction is allowed. Here, too, there is a connecting channel 63 which is connected either directly to working fluid guide channel 20 or to working fluid guide channel or chamber 19. This connection can hereby be at least indirect, that is directly or also indirectly through additional channel segments. Working fluid guide channel or chamber 19 and/or the working fluid guided in it and the resulting pressure difference exerted on the face 61 facing away from secondary impeller 7.5 serves to actuate switchable clutch 9, particularly the effect of piston 55 on the two clutch disks 12.5 and 13.5 which can be brought into working contact. Connecting line 63 is hereby connected to the working fluid guide channel or chamber 19 formed between piston 55 and inner circumference 28 of primary impeller housing 18. From this, through piston 55, there is an additional connecting line 68 which is connected to the cylinder, particularly working chamber 64 of cylinder-piston unit 58. The pressure ratios resulting in working chamber 64 served to move turbine bolt 57. This is thus connected to piston 60 guided in the working chamber 64.

The pivoting and/or attachment of piston 55 can also be to secondary impeller 7.5.

For all embodiments shown in FIGS. 1 through 5 it is the case that these are solely examples, whereby the scope of protection is not limited to these embodiments. The concrete structural design hereby depends on the embodiment of the impellers and the housing or the primary impeller housing, and furthermore on the conditions of installation and spatial considerations in the working fluid guide channels or chambers.

LIST OF REFERENCE NUMBERS 1, 1.2, 1.3,
1.4, 1.5, 1.6 Starting unit
2, 2.2, 2.3,
2.4, 2.5, 2.6 Means of influencing the transmission ratio
3 Pressure medium actuated integrated mechanical components
4, 4.3, 4.4,
4.5, 4.6 Starting element
5, 5.3, 5.4,
5.5, 5.6 Hydrodynamic clutch
6, 6.3, 6.4,
6.5, 6.6 Primary impeller
7, 7.3, 7.4,
7.5, 7.6 Secondary impeller
8, 8.3, 8.4,
8.5, 8.6 Working compartment
9 Switchable clutch
10 First power branch
11 Second power branch
12 Clutch input disk
13 Clutch output disk
14 Actuation system
15 Actuation system
16 Working fluid inlet and supply system
17 Housing
18 Primary impeller housing
19 First working fluid guide channel or chamber 20 Working fluid inlet channel
21 Drain channel
22 Radially outer region
23 Hollow shaft
24 Input shaft
25 Connecting line
26 Actuation system
27, 27.3 Ring slide
28 Inner circumference
29 Outer circumference
30 Intermediate chamber
31 Actuation system
32 Cylinder
33 Face of piston facing away from the connection of the working piston with the ring slide
34 Working piston
35 Wall
36 Wall
37 Inner circumference
38 Component
39 Element
40 Connecting channel to piston
41 Working chamber
42 Piston side facing away from the secondary impeller
43 Wall region
44 Ring-shaped element
45 Actuation system
46 Cylinder-piston unit
47 Piston
48 Cylinder
49 Wall element
50 Inner wall
51 Face
52 Outer circumference
53 Inner circumference
54 Cylinder-piston unit
55 Piston
56 Chamber
57 Turbine bolt
58 Cylinder-piston unit
59 Actuation system
60 Piston
61 Face
62 Connecting line
63 Working chamber
64 Side chamber
65 Second working fluid guide channel or chamber
68 Connecting line

The invention claimed is:

1. A starting unit, comprising:
an input which can be connected to a drive and an output which can be connected to a load;
a starting element in the form of a hydrodynamic clutch comprising a primary impeller and a secondary impeller which together form a working compartment which can be filled with working fluid, said hydrodynamic clutch being free of a guide wheel;
a switchable clutch comprising at least two clutch elements which can be brought into a working frictional connection with one another directly or indirectly through additional transmission means; the at least two clutch elements including a first clutch element and a second clutch element which are connected respectively with the input and the output at least indirectly in a rotationally fixed manner and which are actuated by means of a clutch actuation system;
a housing enclosing at least one impeller in the axial direction forming at least one working fluid guide channel or chamber and connected to the primary impeller in a static or rotationally fixed manner;
the clutch actuation system of the switchable clutch being at least indirectly connected to the working fluid guide channel or chamber as a pressure source, whereby the working fluid guide channel or chamber can be connected at least indirectly to a working fluid inlet channel;
means to influence the transmission ratio of the hydrodynamic component;
the means to influence comprising pressure medium actuated integrated mechanical components which act at least indirectly on the working circulation in the working compartment and which have an actuation system;
the integrated mechanical components being implemented in the form of separate elements which can be introduced into the working compartment or in the form of a partial region of a wall of one of the impellers guiding the flow in the working compartment which can be moved in the axial direction;
the pressure medium actuated integrated mechanical components being impinged upon by pressure medium from the inlet channel or the working fluid guide channel or chamber, whereby the position of the pressure medium actuated integrated mechanical components relative to the working compartment is a function of differential pressure between pressure medium diverted from the inlet channel or the working fluid guide channel or chamber and pressure in the interior of the housing in the area of the clutch actuation system.

2. The starting unit according to claim 1, wherein the pressure medium actuated integrated mechanical components take effect on an arbitrary diameter between an inner diameter and an outer diameter of the working compartment.

3. The starting unit according to claim 2, wherein the pressure medium actuated integrated mechanical components are guided either along the housing and/or along the primary impeller or secondary impeller.

4. The starting unit according to claim 2, wherein the actuation systems system of the individual integrated mechanical components is fastened to the housing connected to the primary impeller in a static or rotationally fixed manner.

5. The starting unit according to claim 1, wherein the pressure medium actuated integrated mechanical components are guided along the housing and/or along one of the primary impeller or secondary impeller.

6. The starting unit according to claim 5, wherein the actuation system of the individual integrated mechanical components is fastened to the housing connected to the primary impeller in a static or rotationally fixed manner.

7. The starting unit according to claim 1, wherein the actuation system of the individual integrated mechanical components is fastened to the housing connected to the primary impeller in a static or rotationally fixed manner.

8. The starting unit according to claim 7, wherein the integrated mechanical components actuation system comprises a cylinder-piston unit, whereby the piston is connected to the integrated mechanical components.

9. The starting unit according to claim 8, wherein the cylinder is formed by a wall of the housing or a separate integrated part in the housing or in a piston of the clutch actuation system of the switchable clutch.

10. The starting unit according to claim 1, wherein the actuation system of the individual integrated mechanical components is located at the clutch actuation system of the switchable clutch and is at least partially formed by the clutch actuation system.

11. The starting unit according to claim 1, wherein the pressure medium is guided to the clutch actuation system through at least one connecting line at least indirectly connected to the working fluid inlet channel and/or the working fluid guide channel or chamber.

12. The starting unit according to claim 11, wherein the connecting line is led inside the housing.

13. The starting unit according to claim 11, wherein the connecting line is connected through an intermediate chamber between the clutch actuation system of the switchable clutch to the actuation system of the integrated mechanical components.

14. The starting unit according to claim 11, wherein the connecting line is connected with a line extending in the clutch actuation system of the switchable clutch or with a line connected to the clutch actuation system.

15. The starting unit according to claim 1, wherein the pressure medium actuated integrated mechanical components comprise a ring slide which can be moved in the axial direction and which is formed from at least a partially ring-shaped element extending in the circumferential direction.

16. The starting unit according to claim 1, wherein the pressure medium actuated integrated mechanical components are formed from a bolt-shaped element which can be moved in the axial direction.

17. The starting unit according to claim 1, wherein the integrated mechanical components are formed by a partial region of a wall of one of the impellers which is used to guide flow circulation.

18. The starting unit according to claim 1, wherein the pressure medium actuated integrated mechanical components are located on the primary impeller.

19. The starting unit according to claim 1, wherein the pressure medium actuated integrated mechanical components are located on the secondary impeller.

* * * * *

UNITED STATES PATENT AND TRADEMARK OFFICE
CERTIFICATE OF CORRECTION

PATENT NO. : 7,665,588 B2  
APPLICATION NO. : 10/595647  
DATED : February 23, 2010  
INVENTOR(S) : Achim Menne Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 724 days.

Signed and Sealed this

Seventh Day of December, 2010

David J. Kappos  
*Director of the United States Patent and Trademark Office*